United States Patent [19]

Todokoro

[11] Patent Number: 4,531,751
[45] Date of Patent: Jul. 30, 1985

[54] TOY MOTORCYCLE

[76] Inventor: Masatoshi Todokoro, 2-33 Koganehara 2-chome, Matsudo-shi, Chiba 270, Japan

[21] Appl. No.: 598,583

[22] Filed: Apr. 10, 1984

[51] Int. Cl.³ .............................................. B62M 1/00
[52] U.S. Cl. ............................ 280/1.11 R; 280/1.14; 446/7; D21/81
[58] Field of Search ................ 280/1.13, 1.11 R, 1.14; D21/81, 76, 73, 71, 63, 142, 60; 446/7, 29, 404, 397, 415; 434/61

[56] References Cited

U.S. PATENT DOCUMENTS

| 219,608 | 12/1970 | Carver | D21/76 |
| 262,301 | 12/1981 | Appel | D21/142 |
| 3,874,700 | 4/1975 | Lohr | 280/1.11 R |
| 4,055,914 | 11/1977 | Ieda | 446/404 |

Primary Examiner—Joseph F. Peters, Jr.
Assistant Examiner—Everett G. Diederiks, Jr.
Attorney, Agent, or Firm—George B. Oujevolk

[57] ABSTRACT

Generally speaking, the present invention contemplates a toy motorcycle. It has a molded seat unit which imitates the body of a real motorcycle. There is a handlebar unit molded so as to imitate the handlebars of a real motorcycle which is rotatably attached to the seat unit. An imitation speedometer, an imitation fuel gauge, and an imitation flasher are provided on the handlebar unit with rotary discs provided within these imitation speedometer and fuel gauge to provide the illusion of speed and fuel. There is also an imitation flasher and a motor operated by turning grips on the handlebar unit. These illusion creating arrangements are operated by a gear train and other power-transmitting parts to which the motor drive shaft the rotary discs and flasher vanes are connected.

4 Claims, 9 Drawing Figures

TOY MOTORCYCLE

FIELD OF THE INVENTION

This invention relates to a toy which looks like a motorcycle.

SUMMARY OF THE INVENTION

A first object of the present invention is to provide a toy motorcycle with which a child can play by pretending to be a rider on a real motorcycle.

A second object of the present invention is to provide a toy motorcycle with which a child can play by pretending to be a rider on a type of motorcycle which is liked by the child, in particular a white-painted police motorcycle.

A third object of the present invention is to provide a motorcycle which enables a child to discover what it is like to ride a police motorcycle, and play at being a motorcycle patrolman.

A fourth object of the present invention is to provide a safe toy motorcycle which does not run away when a child is sitting on it.

The nature, principle, construction and operation of the present invention will become clearer from the following detailed description of the preferred embodiments, with reference to the accompanying drawings.

DESCRIPTION OF THE EMBODIMENTS

Figure 1:
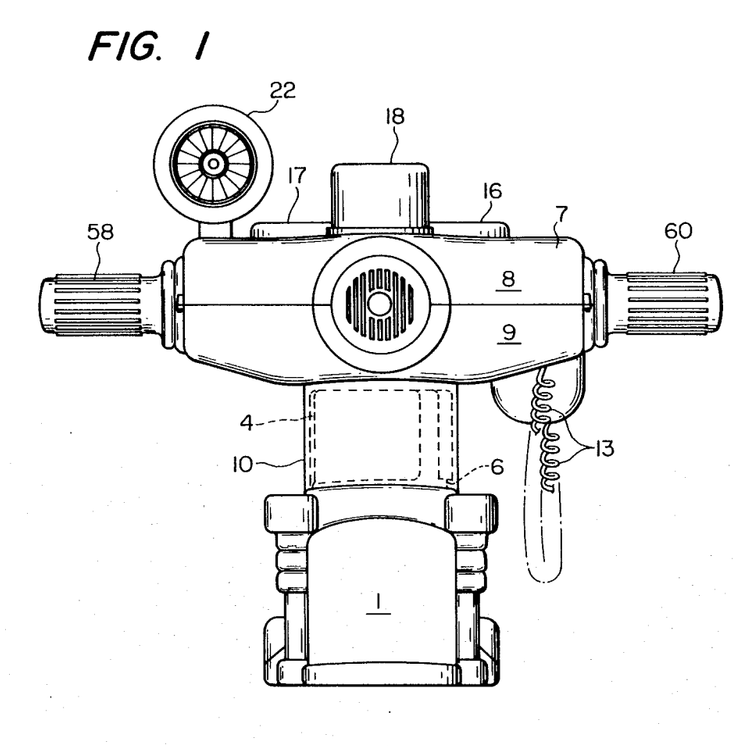
FIG. 1 is a front elevation of one embodiment of the toy motorcycle according to the present invention.
Figure 2:
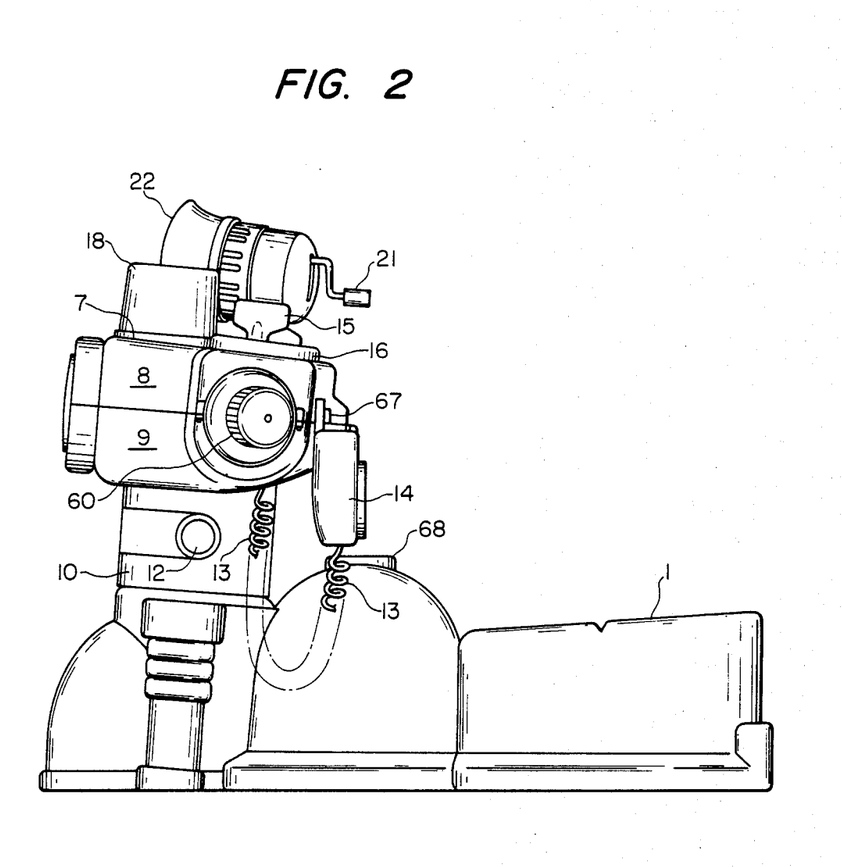
FIG. 2 is a right side elevation of the embodiment of FIG. 1.
Figure 3:
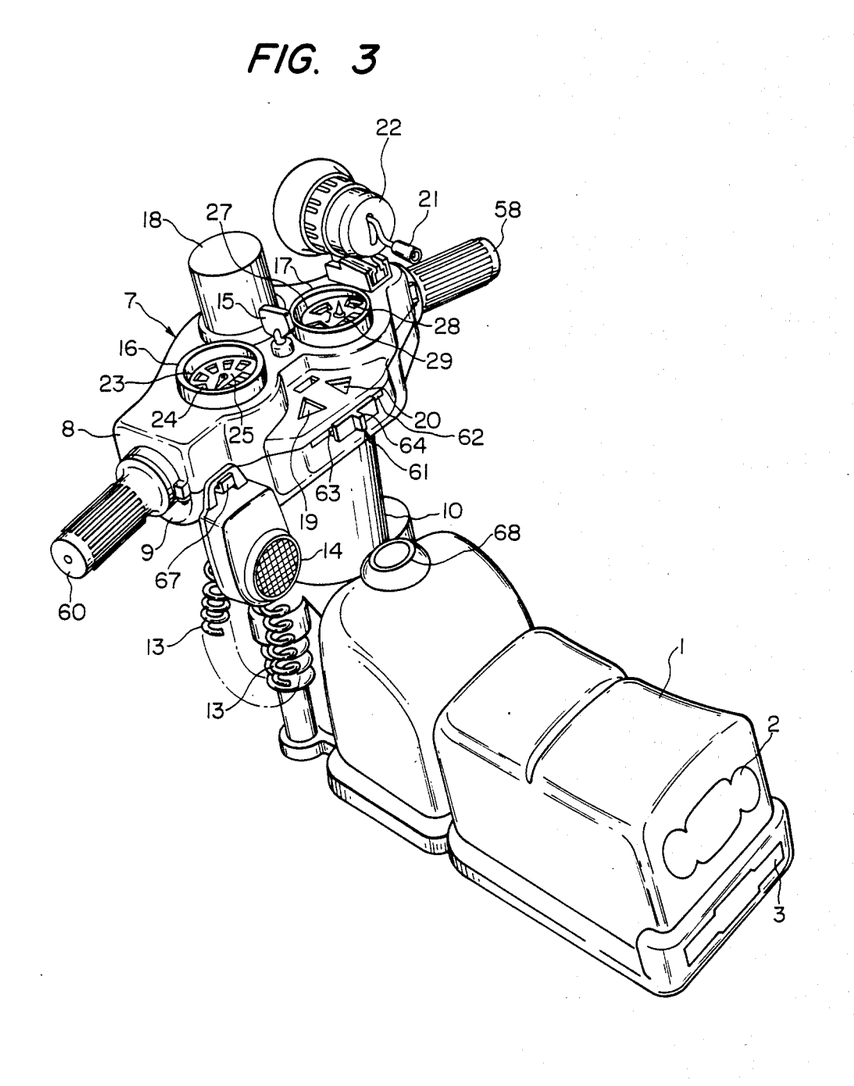
FIG. 3 is a perspective view of the embodiment, taken from the side of a seat unit thereof.
Figure 4:
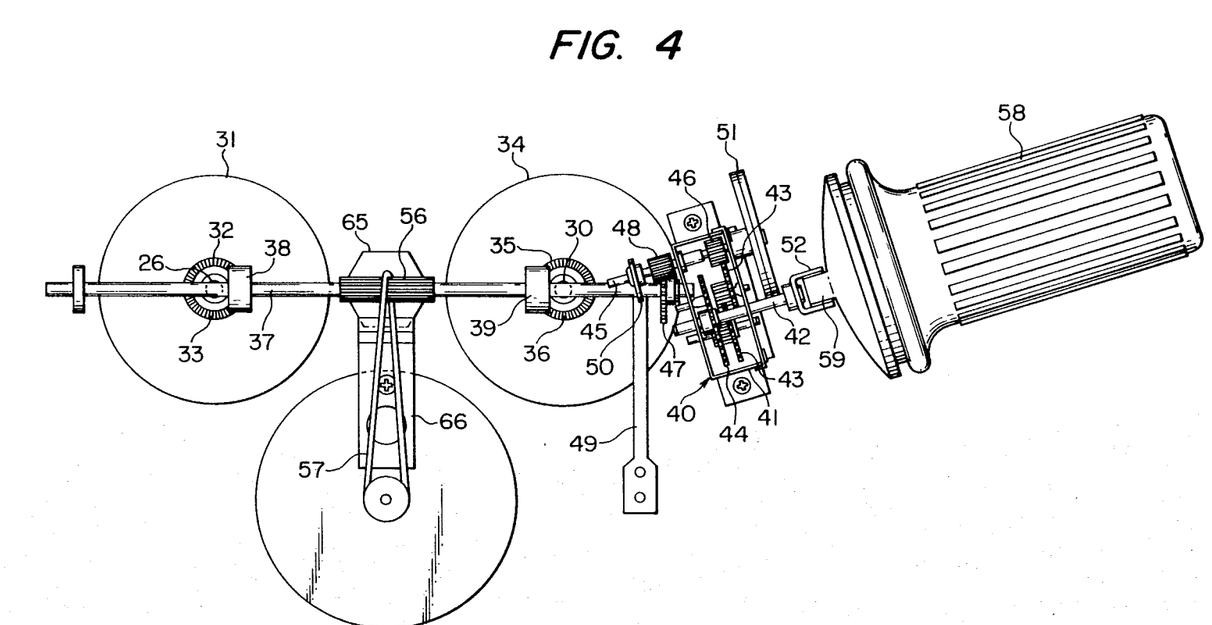
FIG. 4 is an enlarged plan view of a driving mechanism provided within a handlebar unit of the embodiment.
Figure 5:
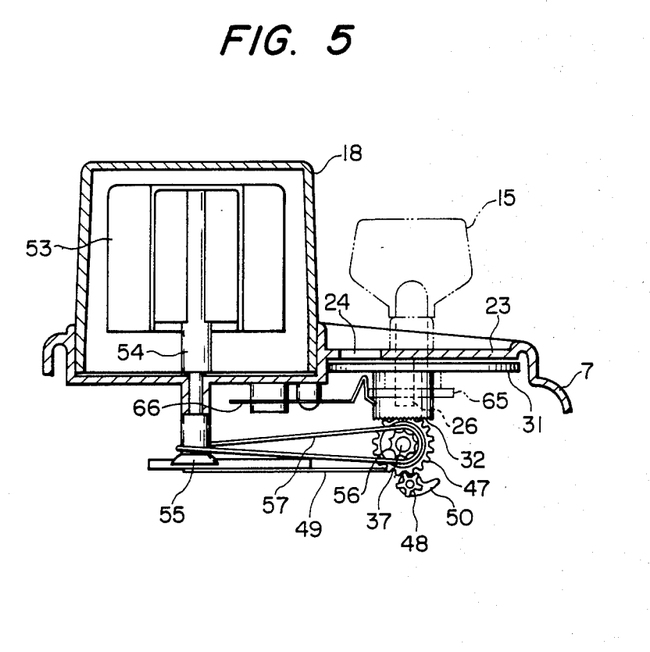
FIG. 5 shows an imitation flasher in section and its driving mechanism in side elevation.

The preferred embodiments of the present invention will now be described with reference to the drawings. Referring to FIGS. 1-3, reference numeral 1 denotes a hollow seat unit of a color identical with that of the body of a police motorcycle, which is molded out of plastic so as to imitate the body of a police motorcycle. A seal 2 on which the external appearance of tail lamps is drawn, and a seal 3 on which the external appearance of a number plate is drawn are stuck over a rear end surface of the seat unit 1. Reference numeral 4 denotes a cylindrical projection extending from a front portion of the upper surface of the seat unit 1, and which is provided with vertical grooves 5 in three portions of the outer surface thereof and a groove 6 in the circumferential surface of a base portion thereof, and 7 denotes a hollow handlebar unit molded out of plastic to imitate the handlebar unit of a police motorcycle, and which has upper and lower separatable members 8, 9 joined together with screws. A vertical cylinder 10 fitting around the projection 4 is provided in the central portion of the lower surface of the separatable member 9. The lower end of the vertical cylinder 10 is provided with locking projections 11 wide enough to slide along the vertical grooves 5 and deep enough to slide along the groove 6. A seal 12, on which a police mark and the external appearance of a head lamp are drawn, is stuck over the outer surface of the vertical cylinder 10 so as to extend from the front portion thereof to both side portions thereof. One end of a spiral cord 13 is attached to a left side portion of the lower surface of the separatable member 9, and an imitation microphone 14 molded to imitate a hand microphone is fixed to the other end thereof. An imitation key 15 molded to imitate a master key is attached rotatably to the central portion of the upper surface of the separatable member 8. An imitation speedometer 16 and an imitation fuel gauge 17 are formed to the right and left, respectively, of the imitation key 15. An imitation red flasher 18 is attached to a portion of the separatable member 8 in front of the imitation key 15, and triangular holes 19, 20 are formed separately in right and left portions of an inclined stepped section provided behind the imitation key 15. An imitation siren 22, which has the external appearance of the siren on a police motorcycle, and which can produce, when a handle 21 is turned, a sound similar to that produced by the siren on a police motorcycle, is attached to a portion of the separatable member 8 to the right of the imitation fuel gauge 17. A circular frame of the imitation speedometer 16 is provided with a disc 23 contacting unitarily the inner wall thereof, and a plurality of holes 24, for example five holes 24, are provided in a portion of the periphery of the disc 23 which extends between right and left side regions thereof, either side of a front region thereof. A seal 25, on which the external appearance of a speedometer is drawn, is stuck over the upper surface of the disc 23. A shaft 26 projects from the central portion of the lower surface of the disc 23, and the center of a disc 31 of the same diameter as the disc 23 is attached rotatably around the shaft 26. A seal, of which predetermined portions are of different colors in such a manner that these different colors appear in the holes 24 when aligned with them, is over the upper surface of the disc 31. A cylinder 32 is formed on the central portion of the lower surface of the disc 31, integrally therewith, and a lower end surface 33 thereof is provided with a series of thin grooves. A circular frame of the imitation fuel gauge 17 is provided with a disc 27 contacting unitarily the inner wall thereof, and a plurality of holes 28, for example three bores 28, are provided in a portion of the periphery of the disc 27 which extends between right and left side regions thereof, either side of a front region thereof. A seal 29 on which the external appearance of a fuel gauge is drawn is stuck over the upper surface of the disc 27. A shaft 30 projects from the central portion of the lower surface of the disc 27, and a disc 34 of the same diameter as the disc 27 is attached rotatably by its central portion around the shaft 30. A seal, of which predetermined portions are of different colors in such a manner that these different colors appear in the holes 28 when with them, is stuck over the upper surface of the disc 34. A cylinder 35 is formed on the central portion of the lower surface of the disc 34, integrally therewith, and a lower end surface 36 thereof is provided with a series of thin grooves. Reference numeral 37 denotes a drive shaft extending below the shafts 26, 30 in the space within the handlebar unit 7. Circular rubber members 38, 39 pressed into contact with the grooved surfaces 33, 36 of the cylinders 32, 35, respectively, are mounted on the drive shaft 37. The grooved surfaces 33, 36 and the rubber members 38, 39 may be replaced by gears. Reference numeral 40 denotes a motor mounted on a portion of the drive shaft 37 in the space within the handlebar unit 7 which is close to the right end thereof. This motor 40 consists of a frame 41, a shaft 42 inserted through portions of the frame 41 which are aligned with the center of a right end opening of the handlebar unit 7, a gear 44 mounted on a portion of the shaft 42 which extends within the frame 41, a shaft 45 inserted through portions of the frame 41 which are close to the drive shaft 37, a gear 46 mounted on a portion of the shaft 45 which extends within the frame 41, a gear 43 supported rotatably between the gears 44, 46 so as to mesh with one another, a gear 48 meshing with a gear 47 mounted on an end portion of the drive shaft 37, the gear 48 being mounted on a portion of the shaft 45 which projects to a position close to the drive shaft 37, a pawl 50 mounted on this projecting portion of the shaft 45 which rotates in such a manner that the pawl 50 kicks a free end of a resilient metal member 49 attached by its base end to a position close to the frame 41, a flywheel 51 mounted on a portion of the shaft 45 which projects from the frame 41 in the direction opposite to the direction of the drive shaft 37, and a U-shaped joint 52 mounted on a portion of the shaft 42 which projects to a position close to the right end opening of the handlebar unit 7. Reference numeral 53 denotes movable vanes provided rotatably in a cover of the imitation flasher 18. The lower end of a support shaft 54 for the movable vanes 53 projects into the space within the handlebar unit 7, and a pulley 55 is mounted on the projecting end of the shaft 54. A rubber band 57 is wrapped around the pulley 55 and a friction pipe 56 fitted around an intermediate portion of the drive shaft 37. Reference numeral 58 denotes a grip engaged rotatably with the right end opening of the handlebar unit, a projection 59 fitting in the U-shaped joint 52 is provided on the central portion of the end surface of the grip 58 close to the right end opening of the handlebar unit 7. Reference numeral 60 denotes a grip fixed at the left end opening of the handlebar unit 7, an imitation direction indicator 61 consisting of a sliding member covers the holes 19, 20 from the lower sides thereof and is set so that it can slide laterally, a shaft 63 is provided on the sliding member 61 so as to extend to the outside of the handlebar unit 7 through an elongated hole 62 made in the joint between the separatable members 8, 9 of the handlebar unit 7, and a knob 4 is attached to the shaft 63. The upper surface of the sliding member 61 is colored in the following manner. When the knob 64 is in a position corresponding to an intermediate position between the holes 19, 20, the same color, for example black, appears in the holes 19, 20. When the knob 64 is pressed toward the hole 19 to move the sliding member 61 to the left, the color displayed in the hole 19 is changed to another color, for example green, but the color displayed in the hole 20 does not change. When the knob 64 is pressed toward the hole 20 to move the sliding member 61 to the right, the color displayed in the hole 20 changes to green in the same way as when the knob 64 is pressed toward the hole 19, and the color displayed in the hole 19 is unchanged. The lower end of the imitation key 15 inserted into the space within the handlebar unit 7 is provided with a hexagonal control plate 65, as shown in FIG. 4. A plate spring 66 contacts one side surface of the control plate in such a manner that the imitation key 15 is stopped under pressure each time the imitation key is rotated through a predetermined angle. Reference numeral 67 denotes a projection used for hanging the imitation microphone 14 thereon, and 68 denotes a circular projection formed so as to imitate the inlet by which gasoline is poured into the fuel tank of a police motorcycle.

The operation of the toy motorcycle with this construction will now be described. When a child sitting astride the seat unit 1 and grasping the grips 58, 60 in both hands turns the grips to the left, the handlebar unit 7 as a whole is directed to the left. This makes the child feel that he is turning a police motorcycle to the left. Conversely, when the child turns the grips 58, 60 to the right, the handlebar unit 7 as a whole is directed to the right. This makes the child feel that he is turning the police motorcycle to the right. When the grip 58 is turned so as to simulate racing of the engine of a police motorcycle with a loud roar, the rotational movement of the grip 58 is transmitted to the motor 40 via the projection 59 and joint 52, and then from the motor 40 to the discs 31, 34 and movable vanes 53 via the drive shaft 37. As a result, different colors appear in succession in the hole 24 in the disc 23 of the imitation speedometer 16, to give the rider of the toy motorcycle the impression that a real speedometer is operating. Different colors also appear in succession in the holes 28 in the disc 27 of the imitation fuel gauge 17, to give the impression of a real fuel gauge. The movable vanes 53 can be seen to rotate through the cover of the imitation flasher 18, to give the rider the impression that a real flasher is operating to give a warning. As the drive shaft 37 continues to rotate, the free end of the resilient metal member 49 is kicked repeatedly by the pawl 50 to make the metal member 49 to generate a high-frequency sound to simulate the engine sound of a police motorcycle. When the operations of the imitation microphone 14, imitation siren 22 and imitation direction indicator 61 are combined as desired with these operations of the handlebar unit 7, the child riding this toy motorcycle can feel as if he is riding a real police motorcycle.

Figure 6:
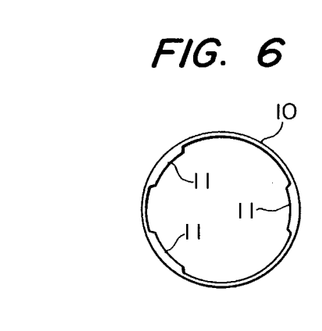
FIG. 6 is a lower end view of a vertical cylinder supporting the handlebar unit.
Figure 7:
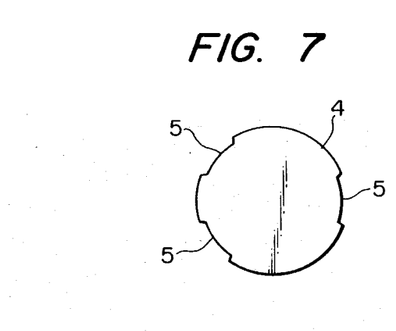
FIG. 7 is an upper end view of a projection extending from a front portion of the upper surface of the seat unit.

When the vertical cylinder 10 is turned to a position in which the locking projections 11 are aligned with the vertical grooves 5 in the cylindrical projection 4, the handlebar unit 7 faces backward. When the handlebar unit 7 is then pulled upward, the vertical cyclinder 10 can be removed from the cylindrical projection 4.

In this embodiment, no wheels are attached to the seat unit 1. Accordingly, the toy motorcycle does not run by itself when the child is sitting on the seat unit 1. This means that the child can play with the toy motorcycle safely, both inside and outside the house.

Figure 8:
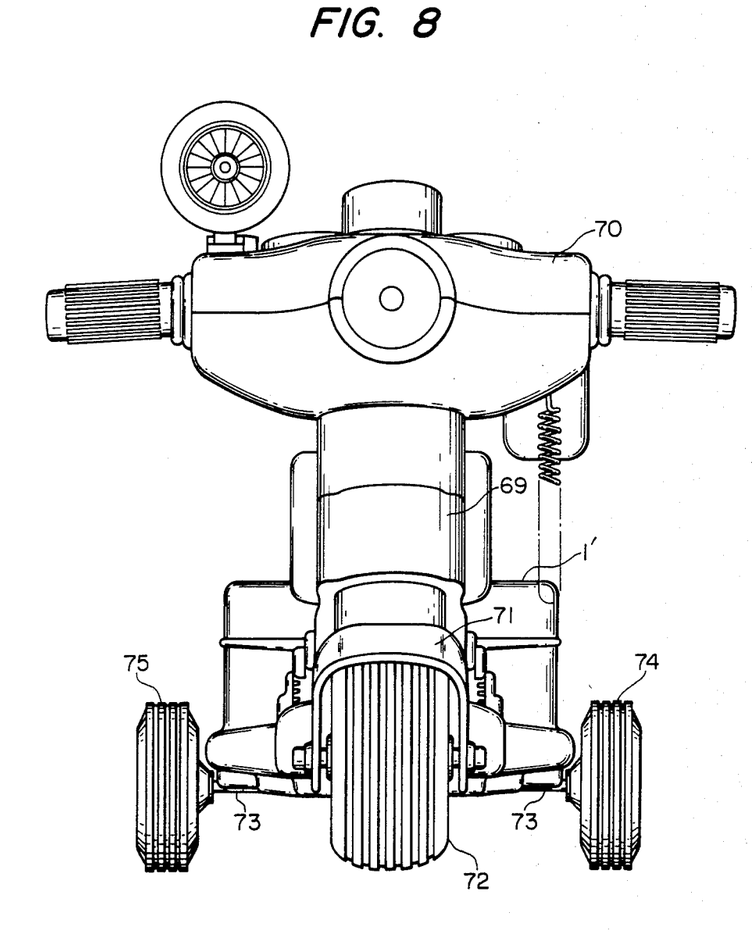
FIG. 8 is a front elevation of another embodiment of the toy motorcycle according to the present invention.
Figure 9:
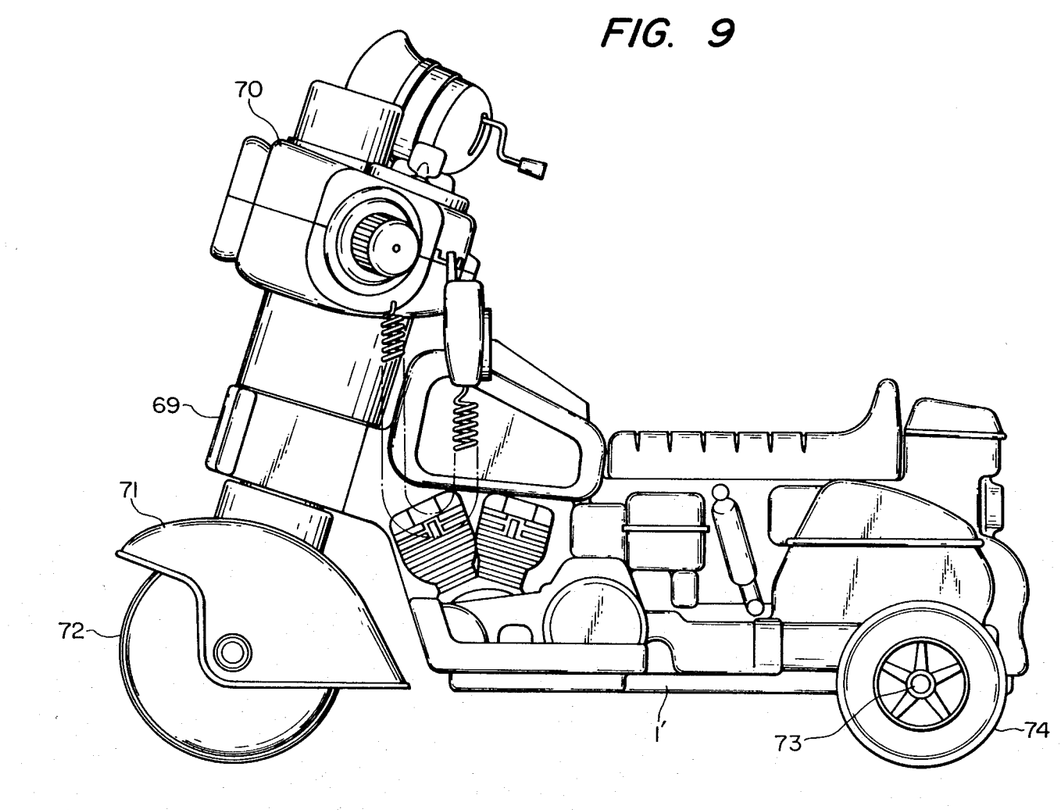
FIG. 9 is a right side elevation of the embodiment of FIG. 8.

As shown in FIGS. 8 and 9, the present invention may also consist of a hollow seat unit 1' molded out of plastic to imitate the body of a police motorcycle, a projection 69 provided on a front portion of the seat unit 1', a rotatable shaft (not shown) extending vertically through the projection 69, a handlebar unit 70 similar to the handlebar unit 7 of the previous embodiment provided at the upper end of the rotatable shaft, a front wheel 72 provided with a fender 71 and which is attached to the lower end of the rotatable shaft, various elements provided inside and outside the handlebar unit 70 similar to corresponding elements in the previous embodiment, an axle 73 extending through a rear portion of the seat unit 1' so as to project from both side surfaces thereof, and rear wheels 74, 75 mounted on either end of the axle 73, so that the seat unit 1' can be moved along a surface, the direction in which the toy motorcycle is moved being made freely variable by operating the handlebar unit 70.

The present invention may also be formed to imitate various types of motorcycles other than a police motorcycle.

In these embodiments of the present invention, the sticking of seals onto the various parts thereof may be replaced by the direct coloring of the surfaces of these parts.

I claim:

1. A toy motorcycle, comprising in combination:
(a) a seat unit having defined front and rear portions;
(b) a projection (4) extending from the front portion of the seat unit with a vertical cylinder (10) fitted around the projection (4), a handlebar unit (7) mounted so as to turn left and right on said cylinder, said handlebar unit having an upper portion thereon an imitation key (15), an imitation speedometer (16), an imitation fuel gauge (17), with an aperture in said speedometer and said fuel gauge, an imitation flasher (18), two defined opposite sides to said handlebar unit with a handlebar affixed to each of said two sides, a rotatable grip (58) mounted on each one said rotatable grip handlebar, a fixed grip (60) mounted on the other handlebar, having a drive shaft (42) affixed thereto;
(c) a simulated motor (40) with a frame (41) located within said one handlebar, said drive shaft (42) extending within said frame, a gear train (44, 43, 46, 48, 47) driven by said drive shaft, second shaft means (45, 37) with a projecting portion extending through said frame (41) driven by said gear train, discs (31, 34) positioned below the apertures of said imitation speedometer aperture and said imitation fuel gauge aperture, with simulated speed and fuel signals on said discs, said discs (31,34) being coupled to said second shaft means (45, 37) for rotation; and,
(d) rotatable vanes (53) in said flasher (18) with pulley and belt means (55, 57) connecting said second shaft means (45, 37) and said rotatable vanes (55) so as to turn the vanes in said flasher (18), also, a pawl (50) coupled to said gear train and acting to hit a resilient metal piece (49) which when contacted by said pawl produces a motor-like sound.

2. A toy as claimed in claim 1 including a siren (22) on said handlebar unit with a crank handle (21).

3. A toy as claimed in claim 2 including a projection (67) at one side of said handlebar unit and an imitation michrophone (14) held thereon with a spiral microphone cord (13) attached thereto.

4. A toy as claimed in claim 3 including a front wheel (72) with a fender (71) coupled to the front end of said unit, an axle (73) extending through the rear portion of the seat unit with rear wheels (74, 75) mounted on said axle (73).

* * * * *